July 12, 1966  S. S. CLAXTON  3,260,296
TIRE REPAIR UNIT
Filed July 13, 1964

Sherry Springer Claxton,
INVENTOR.
WHANN & McMANIGAL
Attorneys for Applicant tire repair unit, and is more particularly concerned with patches having cord-reinforced body structures for use in the repairing of breaks or injuries in a tire casing or a carcass.

United States Patent Office 3,260,296
Patented July 12, 1966

3,260,296
TIRE REPAIR UNIT
Sherry Springer Claxton, Los Angeles, Calif., assignor to Tru-Flex Rubber Products Company, Los Angeles, Calif., a corporation of California
Filed July 13, 1964, Ser. No. 382,110
2 Claims. (Cl. 152—367)

The present invention relates generally to a tire repair unit, and is more particularly concerned with patches having cord-reinforced body structures for use in the repairing of breaks or injuries in a tire casing or a carcass.

The flexing action and stresses set up in the carcass of a tire under varying conditions of load and temperautre are of a complex and variable nature. In each revolution of an inflated tire, the load causes flexing of the tire cords to occur not only within the sidewalls of the tire, but also within the central portion thereof. The tire cords, although embedded in rubber, actually move in relation to each other, and by this movement frictionally generate heat which is transmitted to and distributed into the body of the tire carcass. Heat energy buildup within the tire is also affected by the outside ambient air temperature. The tire cords will therefore expand or contract in relation to the heat energy to which they are subjected.

A repair unit patch having a body structure constructed of cord plies, when installed in a tire, is also subjected to movement within itself as a result of the flexing, and the expansion and contraction due to the temperature changes. These movements in the patch, for various reasons may not be exactly the same as those in the tire. For example, the cord materials may not be identical, the coefficient of expansion in the patch may be different than that of the tire, the fact that the center of the patch is firmly attached to the plug, and the fact that the patch center of gravity is farther away from the middle ply of the tire than the rest of the plies, etc.

A through break in the carcass of a tire can be repaired by utilizing a repair unit patch. The first step is to skive out or remove all the damaged cords and rubber to provide a shape similar to an hour glass, a bullet hole, or a V-shape. Following well known procedure, the hole thus formed is filled with rubber material to provide a plug. A repair unit patch of suitable size is then centered over the plug and extends outwardly over the injury in the tire, after which the whole is vulcanized together.

As thus installed, the center of the patch and the plug are thoroughly attached; and, if this attachment is considered to be the zero point in movement, it can now be said that, as the tire rolls along a path of travel, there will be movement within the tire cords and the patch cords in all directions from this plug.

As previously stated, movements within the patch cords may or may not be the same as the movements within the tire cords, and therefore in essence may form the basis for potential failure of the repair. Eventually, the cord ends of the patch break through their protective rubber covering and failure soon occurs. It therefore becomes evident that, if a patch is constructed in a manner which will permit it to stretch or contract more than the cords of the tire in any direction, it will then be possible for the cords in the patch and the tire to move together.

In constructing a "stretchable" patch, it is desirable to provide a body structure in which peripheral portions of the core will be able to stretch, while the central portion over the plug should have adequate strength and "non-stretchability" to replace the tire plies that were injured. This can be accomplished by constructing the body structure with elongate members which provide peripheral ends or wings of a material having the desired stretch characteristics, and by using heavier central members of a strong material having a stretch characteristic substantially no greater than the tire cords. Thus, the ideal patch is so constructed that at its center it has no stretchability, and beyond the injury has an outwardly increasing degree of stretchability in all directions from the center.

Having in mind the desired characteristics for an ideal patch, it is one object of the present invention to provide an improved patch body structure in which the stretchable and non-stretchable portions thereof will be more perfectly oriented and compatible with that of the associated tire cords surrounding the injury.

To such end, it is within the broad concepts of the present invention to utilize stretchable cord, strand or fiber materials, and arrange these materials in such a manner that the composite structure of the patch cords, strands or fibers will stretch with the tire cords. For such purpose, it is proposed to use stretchable plies which may be constructed in a number of different embodiments, among which may be mentioned:

(a) Plies constructed with the patch cords on the bias with respect to the tire cords.

(b) Plies constructed of square woven fabric which is cut on the bias.

(c) Plies constructed of cord fabric which is stretchable within itself, i.e. loosely twisted.

A further object of the invention is to provide a repair unit in the form of a tire patch having a body structure consisting of elongate ply strips in angular relation and in which the ply strips have transversely extending cords on a bias, and in which a cushioning member is intimately attached to the core structure and extends beyond its entire area.

Another object is to provide a plurality of superimposed reinforcing plies in a patch body structure having crossed plies in angular relation, and in which additional reinforcing plies are placed at the center of the ply strips with portions thereof extending into the angular spaces between the ends of the ply strips.

Still another object is to provide in a patch repair unit a body structure having crossed sets of plies in angular relation, and a cushion member having lobes at the ends of the ply members and indented peripheral portions extending inwardly between the ends of the ply members.

Further objects of the invention will be brought out in the following part of the specification, wherein detailed description is for the purpose of fully disclosing the invention without placing limitations thereon.

Referring to the accompanying drawings, which are for illustrative purposes only:

Figure 1:
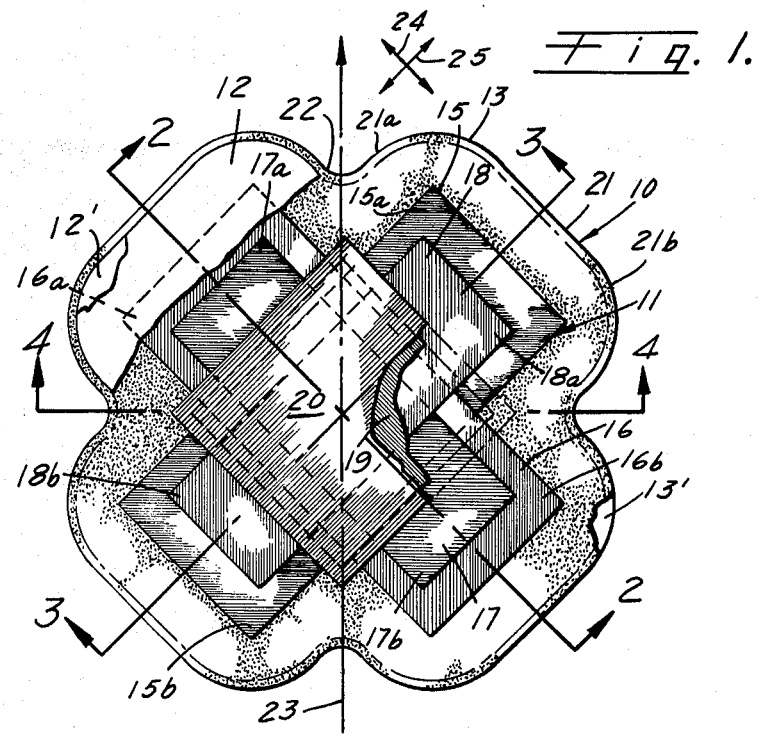
FIG. 1 is a plan view with parts broken away of a tire repair unit embodying the features of the present invention.

Referring more particularly to the drawings, for illustrative purposes, the tire repair unit of the present invention is shown in FIG. 1 as comprising a unitary structure 10 in which a reinforcing body structure, as generally indicated at 11, is sandwiched between a top cushion member 12 of rubber and a bottom bonding cushion member 13 of rubber. The bottom cushion has its peripheral margin extending slightly beyond the perimeter of the top cushion and is adapted to be bonded to the inside of the tire carcass. Conventional protective backing material layers 12' and 13' may be applied to the outer faces of the top and bottom cushion members respectively to protect these surfaces until such time as the patch is put into the carcass.

As best shown in FIG. 1, the body structure 11 consists of a plurality of superimposed rubberized fabric reinforcing members containing load carrying cords which are bonded together with rubber filling the spaces between the cords. The cords may be of nylon or other conventional material, as desired.

The bottom reinforcing members comprise elongate strips 15 and 16, of similar configuration, which are placed in crossed position with the strip ply 15 lowermost and the strip ply 16 uppermost. These plies are positioned in angular relation with their centers at the center of the bottom cushion member 13 and with their ends forming extended wings in spaced angular relation. It will be observed that the reinforcing cords of the strip plies 15 and 16 are at an angle to the longitudinal axis of the ply so that these cords in each case extend transversely on a bias, and that the cord lengths in the opposite corners of strip ply 15, as indicated by the numerals 15a and 15b, are of very short length so that at these corners the length change under stress will be reduced to a minimum. Similar corners 16a and 16b are indicated for the strip ply 16.

Aligned with each of the first plies are superimposed plies of narrower and shorter strips. In the arrangement shown, a strip ply member 17 is symmetrically positioned lengthwise in surface engagement with the strip ply 16. Next, a similar strip ply member 18 is laid across the central portions of strip plies 16 and 17 with its ends extending there beyond and being adapted to make surface engagement with the corresponding ends of strip ply 15. The reinforcing cords of the strip plies 17 and 18 are also arranged on a bias, and are shown as being oppositely inclined with respect to the bias extending cords of their associated first ply strips. In the case of the strip ply 17, it will have the short cords in opposite corners, as indicated at 17a and 17b, while the strip ply 18 will have the short cords at the corners indicated at 18a and 18b. As thus arranged, it will be observed that the cords of the associated ply members extend at an angle to each other, and further that the cords of the sets of angularly positioned plies are also in angular relation to each other to provide stretch in different directions. It is therefore within the concept of the present invention to utilize in a single ply, a fabric material having multi-directional stretch characteristics to obtain the same effect as described above.

Centrally and above the crossing portions of the strip plies 15, 16, 17 and 18 are central reinforcing strip plies 19 and 20 which are positioned with the ply 19 below the ply 20. The uppermost ply has its perimeter extending beyond the perimeter of the under ply, and as thus arranged these plies have portions which extend into the angular spaces between the elongate strip ply members. The plies 19 and 20 may vary as to overall configuration, but for purposes of illustration have been shown as being substantially square so that the diagonally opposite corners of the ply members will be positioned in the spaces between the ends of the other plies. It will be observed that in the case of the central plies 19 and 20, the parallel cords are straight rather than being on a bias, and that the cords of the respective plies 19 and 20 extend longitudinally in right angled relation. While two plies 19 and 20 have been shown, each having a straight cord arrangement, the ultimate effect results in cords having right angled relation. It is therefore within the concepts of the present invention that right angled cords may be utilized in a single central reinforcing ply.

As shown in FIG. 1, the top and bottom cushion members are extended beyond the area of the body structure to provide a large marginal overlap beyond the ply ends and sides so as to provide a fully stretchable bonding edging with the tire. The portions of the cushion members at the ends of the elongate ply members are arranged in the form of lobes 21 which are rounded at corners as indicated at 21a and 21b. Between the angularly spaced lobes thus formed, the periphery of the cushion members is indented inwardly, as indicated at 22, this indentation extending inwardly between the ends of the elongate plies towards the corner portions of the plies 19 and 20 therein. The rounded corners of the lobes act to spread the stresses in this area instead of concentrating them.

Figure 2:
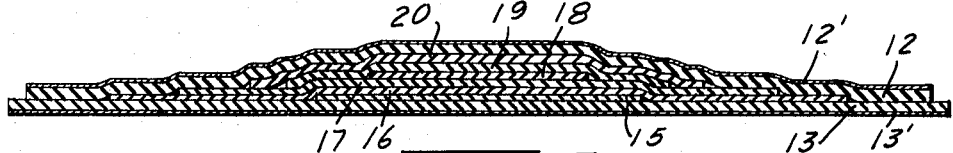
FIG. 2 is an enlarged cross-sectional view, slightly distorted in thickness, taken substantially on line 2—2 of FIG. 1.
Figure 3:
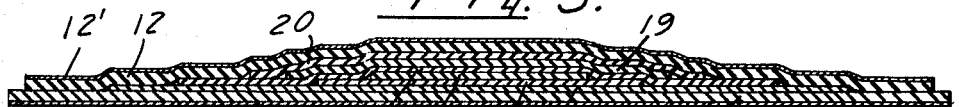
FIG. 3 is an enlarged cross-sectional view, slightly distorted in thickness, taken substantially on line 3—3 of FIG. 1.
Figure 4:
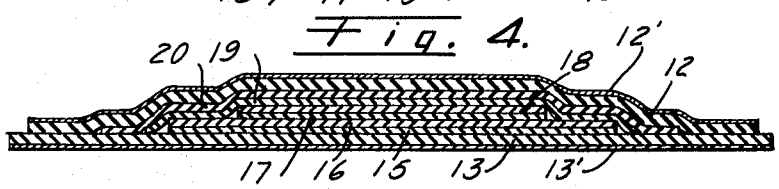
FIG. 4 is an enlarged cross-sectional view, slightly distorted in thickness, taken substantially on line 4—4 of FIG. 1.

By referring to FIGS. 2, 3 and 4, it will be readily seen that the body construction as thus explained provides a graduated core structure of decreasing thickness outwardly from the central portion of the patch towards the patch periphery, and that there is thus provided a more solid and stable portion at the patch center over the tire injury and that as the distance increases outwardly the flexibility becomes gradually greater.

The repair unit of the present invention is arranged to be installed as shown in FIG. 1 wherein it is oriented with respect to the tire axis as shown by locus line 23, and in which position the lobes are symmetrically positioned on opposite sides of this locus line. The tire cords are indicated as to their direction by the crossed arrows 24 and 25. With the patch thus positioned, it will be seen that the biased direction of the cords of the elongate ply members is such that they lie at an angle to the directions of the tire cords, and that stresses in the tire cords are applied to these inner ply members, where the stresses are at the greatest, in a direction so that the stretch may be taken by the rubber between the bias cords. As the distance inwardly of the tire from the injury is increased, the stresses due to tire loading become less, and in this portion of the patch the reinforcing plies 19 and 20 are so oriented that they combine to provide stretch in the direction of the tire cords as well as in directions transversely and axially of the tire carcass. As thus arranged, the patch of the present invention provides a centrally stable body structure at the plug attachment with gradually increasing flexibility substantially in all directions outwardly therefrom. Accordingly, the patch is more effectively accommodated to the tire loadings, and shearing strains greatly reduced so that breakdown of the rubber and delamination in the patch is eliminated or reduced to a great extent.

Various modifications may suggest themselves to those skilled in the art without departing from the spirit of my invention, and, hence, I do not wish to be restricted to the specific form shown or uses mentioned, except to the extent indicated in the appended claims.

I claim:

1. A tire repair unit, comprising: a reinforcing body structure including a plurality of elongate rubber coated ply members having embedded cords transversely extending on a bias to their elongate axis, said members being centrally superimposed upon each other with projecting ends in angularly spaced relation so that the cords of said individual ply members extend at an angle to each other; at least one additional centrally superimposed rubber coated ply member having embedded parallel cords, and having corners respectively extending into the areas between said angularly spaced ends; and a bonding cushion of rubber intimately secured to said reinforcing body structure extending beyond the entire area defined by said body structure.

2. A tire repair unit, comprising: a reinforcing body structure including a plurality of first elongate ply strips in crossed relation at their centers and having outer ends in spaced angular relation, second elongate ply strips of less width and length respectively aligned with said first strips, each aligned first and second strips respectively having rubber embedded cords transversely extending on a bias to its elongate axis; a plurality of additional square ply members of successively increasing perimeter overlying the crossed portions of said first and second strips and having corner portions extending into the spaces between the ends of said strips, said square ply members having parallel rubber embedded cords relatively extending in angular relation; and a bonding cushion of rubber intimately secured to said reinforcing body structure and extending beyond its entire area.

References Cited by the Examiner

UNITED STATES PATENTS 1,968,606 7/1934 Knapton _____ 152—367

FOREIGN PATENTS 868,380 5/1961 Great Britain.
227,482 9/1943 Switzerland.

ARTHUR L. LA POINT, *Primary Examiner.*

C. W. HAEFELE, *Assistant Examiner.*